United States Patent [19]

Cai et al.

[11] Patent Number: 5,696,225

[45] Date of Patent: Dec. 9, 1997

[54] PROCESS FOR MAKING HIGH-PERFORMANCE POLYETHERESTER RESINS AND THERMOSETS

[75] Inventors: Gangfeng Cai, West Chester; Jeffrey A. Klang, Exton, both of Pa.; Lau S. Yang, Wilmington, Del.

[73] Assignee: ARCO Chemical Technology, L.P., Greenville, Del.

[21] Appl. No.: 608,379

[22] Filed: Feb. 28, 1996

[51] Int. Cl.⁶ .................................................. C08G 63/42

[52] U.S. Cl. .................... 528/297; 528/274; 528/275; 528/297; 528/300; 528/301; 528/306; 528/307; 525/11; 525/41; 525/42; 525/43; 525/445; 524/745; 522/6

[58] Field of Search .................... 528/274, 275, 528/297, 300, 301, 306, 307; 525/445, 11, 41, 42, 43; 524/745; 522/6

[56] References Cited

U.S. PATENT DOCUMENTS

| | | | |
|---|---|---|---|
| 3,516,955 | 6/1970 | Taft | 260/22 |
| 3,953,393 | 4/1976 | Ramlow et al. | 525/41 |
| 5,319,006 | 6/1994 | Yang et al. | 523/500 |
| 5,350,814 | 9/1994 | McGarry et al. | 525/531 |
| 5,436,313 | 7/1995 | Klang et al. | 528/274 |
| 5,436,314 | 7/1995 | Yang et al. | 528/274 |

FOREIGN PATENT DOCUMENTS

| | | |
|---|---|---|
| 0580114A2 | 1/1994 | European Pat. Off. |
| 56-129217 | 10/1981 | Japan |

Primary Examiner—Samuel A. Acquah
Attorney, Agent, or Firm—Jonathan L. Schuchardt

[57] ABSTRACT

A process for making high-performance polyetherester resins and thermosets is disclosed. A polyether polyol reacts with a dicarboxylic acid or anhydride in the presence of an insertion catalyst to produce an acid-terminated polyetherester resin. Reaction of this resin reacts with a primary diol or a diepoxy compound gives a chain-extended polyetherester resin that can be cured with a vinyl monomer to produce a high-performance polyetherester thermoset. Properties of the thermosets rival or exceed those of more expensive high-performance iso and vinyl ester resins.

23 Claims, No Drawings

PROCESS FOR MAKING HIGH-PERFORMANCE POLYETHERESTER RESINS AND THERMOSETS

FIELD OF THE INVENTION

The invention relates to polyetherester resins. In particular, the invention is a process for making a polyetherester resin that can be cured with a vinyl monomer to produce polyetherester thermosets. Resins made by the process are particularly valuable in high-performance markets in the unsaturated polyester industry.

BACKGROUND OF THE INVENTION

Recently, we described a new process for making polyetherester resins from polyethers (see U.S. Pat. No. 5,319,006). The process reacts a polyether with a cyclic anhydride (such as maleic anhydride) in the presence of a Lewis acid catalyst. The anhydride inserts randomly into carbon-oxygen bonds of the polyether to generate ester bonds in the resulting polyetherester resin. The polyetherester resin is then combined with a vinyl monomer, preferably styrene, and is cured to produce a polyetherester thermoset.

We later found that, in addition to Lewis acids, protic acids that have a pKa less than about 0 and metal salts thereof will catalyze the insertion of an anhydride into the polyether to produce a polyetherester (see U.S. Pat. No. 5,436,313). We also discovered that these strong protic acids and their metal salts will catalyze the insertion of a carboxylic acid into a polyether (see U.S. Pat. No. 5,436,314).

The ability to make polyetheresters by randomly inserting anhydrides and carboxylic acids into polyethers provides a valuable way of making many unique polyetherester intermediates. While the performance of these polyetheresters is often favorable compared with conventional unsaturated polyester resins, polyetheresters made by insertion have some disadvantages.

Although thermosets made from polyetherester resins often have superior physical properties compared with general-purpose polyester-based thermosets, some properties could be improved. In particular, high temperature performance of the thermosets (as measured by deflection temperature under load, DTUL) is somewhat less than desirable. In addition, tensile and flex properties could be better.

In addition, thermosets made from general-purpose unsaturated polyesters or from polyetheresters made by insertion generally have only fair or poor water resistance. Exposure to harsh environments such as aqueous acid or caustic solutions causes these thermosets to deteriorate. In particular, the thermosets rapidly lose a substantial proportion of flexural strength upon exposure to aqueous solutions. In response to these problems, the unsaturated polyester industry developed two classes of high-performance resins: iso resins and vinyl esters.

"Iso resins," which incorporate recurring units of isophthalic acid, give thermosets with better corrosion resistance compared with those made using general-purpose polyester resins. Because isophthalic acid is relatively expensive, other cheaper ways to make thermosets with good water resistance are needed. In addition, iso resins are still quite susceptible to degradation by aqueous caustic solutions.

Vinyl ester resins currently provide the highest level of physical properties available in the unsaturated polyester industry. When performance must be excellent, and low cost is not important, vinyl esters are often used. Vinyl esters give thermosets with an excellent overall balance of properties, including high tensile and flex strengths and excellent corrosion resistance. Unfortunately, vinyl ester resins are by far the most expensive resins.

In sum, the unsaturated polyester industry has benefitted from the introduction of polyetherester resins made by insertion. However, polyetheresters having characteristics of high-performance polyester resins (iso resins and vinyl esters) are needed. A valuable process would efficiently give polyetherester resins that can rival the performance of high-performance resins, but at a lower cost. Preferably, thermosets from the polyetherester resins would have improved physical properties, especially high tensile strength, flexural strength, and DTUL. A valuable process would give thermosets with improved water resistance without the need to include aromatic dicarboxylic acids, and would give thermosets that better resist exposure to aqueous caustic solutions.

SUMMARY OF THE INVENTION

The invention is a process for making a high-performance polyetherester thermoset. The process comprises three steps. First, a polyether polyol reacts with a dicarboxylic acid or anhydride in the presence of an insertion catalyst to produce an acid-terminated polyetherester resin. Second, the polyetherester resin reacts with an extender selected from primary diols and diepoxy compounds to produce a chain-extended polyetherester resin. Finally, the chain-extended resin reacts with a vinyl monomer in the presence of a free-radical initiator to produce a high-performance polyetherester thermoset.

The invention includes a process for making high-performance polyetherester thermosets in which a polyetherester resin is co-cured with an extender and a vinyl monomer. Thermosets made by this process of the invention are also included.

We surprisingly found that chain extension of polyetherester resins with a primary diol or a diepoxy compound produces resins that give superior thermosets. Thermosets made from primary diol-extended resins have higher DTUL and retain a much higher percentage of flexural strength on exposure to boiling water compared with those made from propylene glycol-capped resins. Epoxy-extended resins of the invention give thermosets with physical properties rivaling those of expensive vinyl ester systems, and also outperform iso resins in flexural strength retention on exposure to aqueous caustic solution. In sum, the invention is a how-cost route to high-performance resins and thermosets.

DETAILED DESCRIPTION OF THE INVENTION

The invention is a three-step process for making high-performance polyetherester thermosets. In the first step, a polyether polyol reacts with an anhydride or a dicarboxylic acid in the presence of an insertion catalyst to produce an acid-terminated polyetherester resin.

Polyether polyols suitable for use in this first step are those derived from ring-opening polymerization of cyclic ethers such as epoxides, oxetanes, oxolanes, and the like, and mixtures thereof. The polyols have oxyalkylene repeat units (—O—A—) in which A has from 2 to 10 carbon atoms, preferably from 2 to 4 carbon atoms. Suitable polyether polyols include, for example, polyoxypropylene polyols, polyoxyethylene polyols, ethylene oxide-propylene oxide copolymers, polytetramethylene ether glycols, and the like, and mixtures thereof. Typically, the polyols have average hydroxyl functionalities from about 2 to about 8, and number average molecular weights from about 250 to about 25,000. Preferred polyether polyols have an average hydroxyl functionality within the range of about 2 to about 6, a hydroxyl number within the range of about 28 to about 260 mg KOH/g, and a number average molecular weight within the range of about 400 to about 12,000. Particularly preferred are polyoxypropylene diols and triols having a number average molecular weight within the range of about 1000 to about 4000. Other examples of suitable polyols appear in U.S. Pat. No. 5,319,006, the teachings of which are incorporated herein by reference.

Anhydrides useful in the process are cyclic anhydrides, which may be saturated or unsaturated. "Cyclic" anhydrides contain the anhydride functionality within a ring. Examples include phthalic anhydride and maleic anhydride. "Saturated" anhydrides contain no ethylenic unsaturation, but may contain aromatic rings. Examples include phthalic anhydride, propionic anhydride, trimellitic anhydride, and succinic anhydride. "Unsaturated" anhydrides contain ethylenic unsaturation that becomes incorporated into the polyetherester resin. Maleic anhydride is an example. Other examples of suitable anhydrides appear in U.S. Pat. No. 5,436,313, the teachings of which are incorporated herein by reference.

Dicarboxylic acids useful in the process are saturated or unsaturated. Preferred dicarboxylic acids are linear, branched, or cyclic $C_3$–$C_{40}$ aliphatic dicarboxylic acids and $C_6$–$C_{40}$ aromatic dicarboxylic acids. Examples include adipic acid, maleic acid, succinic acid, isophthalic acid, and the like, and mixtures thereof. Additional examples of suitable dicarboxylic acids appear in U.S. Pat. No. 5,436,314, the teachings of which are incorporated herein by reference.

The first step is performed in the presence of an insertion catalyst. By "insertion catalyst" we mean a catalyst that promotes random insertion of anhydrides or dicarboxylic acids into carbon-oxygen bonds of a polyether polyol to produce a polyetherester. Suitable insertion catalysts have been previously described. They include Lewis acids (see U.S. Pat. No. 5,319,006 for a general description and examples), protic acids that have a pKa less than about 0 (see U.S. Pat. No. 5,436,313 for examples), and metal salts of these protic acids (see U.S. Pat. No. 5,436,313). Organic sulfonic acids such as p-toluenesulfonic acid are particularly preferred insertion catalysts.

The process used to make the acid-terminated polyetherester resin involves heating a polyether polyol and dicarboxylic acid or anhydride in the presence of an insertion catalyst generally as is taught in U.S. Pat. Nos. 5,319,006, 5,436,313, and 5,436,314. Unlike unsaturated polyesters, this acid-terminated polyetherester resin contains primarily carboxylic acid end groups; the resin is essentially free of hydroxyl end groups. The acid number is typically within the range of about 40 to about 200 mg KOH/g. A more preferred range is from about 60 to about 180 mg KOH/g.

The acid-terminated polyetherester resin will preferably have recurring polyether blocks that have, on average, from about 3 to about 6 oxyalkylene (e.g., oxypropylene, oxyethylene) units. Generally, the resin has an ether/ester mole ratio of at least about 0.75. Preferred acid-terminated polyetherester resins have ether/ester ratios within the range of about 1 to about 3. The resins generally have number average molecular weights within the range of about 500 to about 10,000.

In the second step, the acid-terminated polyetherester resin reacts with an extender selected from primary diols and diepoxy compounds to produce a chain-extended polyetherester resin.

Primary diols have two primary hydroxyl groups (—$CH_2OH$) available for reaction with the acid groups of the acid-terminated polyetherester resin. The diols may include other functional groups that do not interfere with the chain extension reaction, e.g., ether groups. Preferred primary diols are $C_2$–$C_{10}$ diols. Preferred primary diols include ethylene glycol, 2-methyl-1,3-propanediol, neopentyl glycol, diethylene glycol, triethylene glycol, 1,4-butanediol, 1,6-hexanediol, 1,4-cyclohexanedimethanol, 1,4-benzenedimethanol, and the like, and mixtures thereof.

The amount of primary diol used is not critical, and depends on the nature of the acid-terminated polyetherester, the type of primary diol, the desired properties of the chain-extended polyetherester resin, the ultimate thermoset properties sought, and other factors. Typically, an amount within the range of about 1 to about 20 wt. %, and preferably from about 5 to about 10 wt. %, is used based on the total amount of acid-terminated polyetherester resin. The diol-extended polyetherester resins generally have broad molecular weight distributions compared with the acid-terminated polyetheresters from which they are made; the Mw/Mn ratios are typically greater than about 5.

As Examples 1–6 below show, it is important to use a primary diol. Earlier, we showed that polyetherester resins can be capped with propylene glycol to lower the acid number of the resin (see, e.g., U.S. Pat. No. 5,436,313). However, propylene glycol is an ineffective chain extender because it imparts relatively unreactive secondary hydroxyl groups to the polyetherester resin. We found that a significant amount of chain extension occurs when a primary diol is used instead of propylene glycol. This is apparent from the substantial increase in the weight average molecular weight of the primary diol-extended resin (Examples 1–3) compared with a propylene glycol-capped resin of the prior art (Comparative Example 4). The approximate doubling of molecular weight is consistent with chain extension. When a primary diol such as ethylene glycol or 2-methyl-1,3-propanediol is used instead of propylene glycol, the resulting chain-extended polyetherester resins surprisingly give thermosets with significantly higher DTUL and dramatically improved flexural strength retention following 6-day water boil testing.

Diepoxy compounds can also be used as extenders in the process of the invention. Suitable diepoxy compounds have two epoxy groups available for reaction with the carboxylic acid groups of the acid-terminated polyetherester resin. Epoxy resins, such as bisphenol A diglycidyl ether, are preferred diepoxy compounds. Suitable epoxy resins include Shell Chemical's "EPON" resins such as EPON 828 resin, and Dow Chemical's "D.E.R." resins, such as D.E.R. 330 and D.E.R. 331 resins. Other suitable diepoxy compounds include novolak resins (phenol/formaldehyde condensation products), brominated epoxy resins, aliphatic diepoxy compounds (e.g., diepoxides derived from 1,3-butadiene or cyclopentadiene), advanced epoxies (high molecular weight diepoxy compounds), ether-containing diepoxy compounds (diepoxide from diallyl ether, diglycidyl ethers of polyoxypropylene diols such as D.E.R. 732 resin), epoxidized fatty acids, and the like, and mixtures thereof.

The amount of diepoxy compound used is not particularly critical. Generally, the amount used depends on the nature of the acid-terminated polyetherester, the type of diepoxy compound, the desired properties of the chain-extended polyetherester resin, the ultimate thermoset properties sought, and other factors. Usually, at least about 1 wt. % of diepoxy compound is used based on the amount of acid-terminated polyetherester resin. Preferably, the diepoxy compound is used in an amount within the range of about 5 to about 60 wt. %, more preferably from about 10 to about 40 wt. %, based on the amount of acid-terminated polyetherester resin. The epoxy-extended polyetherester resins generally have much broad molecular weight distributions compared with the acid-terminated polyetheresters from which they are made; the Mw/Mn ratios are typically greater than about 8, and can be as high as 30 or more.

The chain-extended polyetherester resins have reduced acid numbers compared with the acid-terminated polyetherester resins from which they derive. The chain-extended polyetherester resins typically have acid numbers less than about 80 mg KOH/g, preferably less than about 60 mg KOH/g. These resins are suitable for use in making polyetherester thermosets.

In step three, the chain-extended polyetherester resin reacts with a vinyl monomer in the presence of a free-radical initiator to produce a high-performance polyetherester thermoset.

Vinyl monomers suitable for use in the invention include, for example, vinyl aromatic monomers, vinyl esters of carboxylic acids, acrylic and methacrylic acid esters, acrylamides and methacrylamides, acrylonitrile and methacrylonitrile, alkyl vinyl ethers, allyl esters of aromatic di- and polyacids, and the like, and mixtures thereof. Preferred vinyl monomers are vinyl aromatic monomers, methacrylic acid esters, and diallyl esters of aromatic di- and polyacids. Particularly preferred vinyl monomers are styrene, vinyl toluene, methyl methacrylate, and diallyl phthalate.

The amount of vinyl monomer used depends on several factors, including the nature of the acid-terminated polyetherester resin, the type of extender used, the desired thermoset physical properties, the particular vinyl monomer used, and other factors. Generally, the amount used will be within the range of about 10 to about 70 wt. % based on the amount of cured polyetherester thermoset; a more preferred range is from about 20 to about 65 wt. %.

Preferably, from about 35 to about 75 wt. % of the polyetherester thermoset derives from the acid-terminated polyetherester resin; a more preferred range is from about 45 to about 65 wt. %. Preferably, from about 1 to about 30 wt. % of the polyetherester thermoset derives from the extender; a more preferred range is from about 5 to about 20 wt. %.

Free-radical initiators useful in the invention are any of the peroxide and azo-type initiators that are well known in the art for curing conventional unsaturated polyester resins. Peroxide initiators are preferred. Suitable examples include benzoyl peroxide, methyl ethyl ketone peroxide, tert-butylperbenzoate, AIBN, and the like. The amount of free-radical initiator used will typically be within the range of about 0.1 to about 5 wt. % based on the weight of cured polyetherester thermoset.

Fillers, glass fibers, pigments, or other additives may be included in the polyetherester thermosets of the invention. Suitable fillers include, for example, talc, calcium oxide, calcium carbonate, aluminum trihydrate, magnesium silicate, alumina, carbon, clays, diatomaceous earth, and the like. Glass powder, spheres, fibers, or chopped glass of any size or shape can be used to reinforce the polyetherester thermoset.

The polyetherester thermosets are made by reacting the chain-extended polyetherester resin, vinyl monomer, and free-radical initiator according to methods well known in the art of making thermosets from unsaturated polyester resins. Typically, a resin mixture that contains vinyl monomer is combined with the free-radical initiator at room or elevated temperature, and is cured to give a solid product that may be post-cured if desired by heating at elevated temperature. The examples below illustrate suitable procedures for making the thermosets.

Polyetherester thermosets of the invention are preferably made by first chain extending an acid-terminated polyetherester resin with a primary diol or a diepoxy compound, and then reacting the chain-extended polyetherester with a vinyl monomer as described above. In another process of the invention, the acid-terminated polyetherester resin is co-cured with the extender and vinyl monomer in a single process step. The advantage of this process is simplicity; the components are simply combined and heated to effect the dual cure. Examples 24–30 below illustrate the co-curing approach.

The co-cure process is less preferred, however. Because free-radical curing occurs rapidly at much lower temperatures compared with chain extension of an acid-terminated polyetherester, it is more difficult to consistently produce thermosets with a high level of physical properties when the co-curing process is used. It is difficult to get the proper combination of free-radical catalyst, chain-extension catalyst (if any), reaction temperature, and post-curing temperatures needed to produce a satisfactory thermoset. In addition, products with high DTUL are hard to make using the co-cure technique; typical DTULs of these products are less than about 160° F.

We surprisingly found that chain extension of polyetherester resins with a primary diol or a diepoxy compound produces resins that give superior thermosets. Thermosets made from primary diol-extended resins have higher DTUL and retain a much higher percentage of flexural strength on exposure to boiling water compared with those made from propylene glycol-capped resins. The 6-day water boil test is an accelerated aging test used in the polyester industry to screen resins and evaluate their likely performance in long-term corrosion testing. Resins that do not perform well in the water boil test are unlikely to exhibit favorable long-term corrosion resistance in actual use.

Examples 1–3 and Comparative Example 4 show that primary diol-extended resins from, e.g., ethylene glycol or 2-methyl-1,3-propanediol give polyetherester thermosets with higher DTULs compared with one made from a propylene glycol-capped resin (228° or 221° F. versus 184° F.). Even more strikingly, the thermoset derived from a primary diol retains 71 to 95% of its initial flexural strength after the 6-day water boil test, while one made using propylene glycol retains only 26%. Importantly, thermosets derived from primary diols show excellent water resistance without incorporation of any aromatic dicarboxylic acid recurring units.

Epoxy-extended resins of the invention give thermosets with physical properties rivaling those of expensive vinyl ester systems, and also outperform iso resins in flexural strength retention on exposure to hot aqueous caustic solution (see Table 9). Tables 3 through 8 show physical properties of epoxy-extended resins made from acid-terminated polyetherester resins. The thermosets generally show an excellent balance of hardness, high DTUL, and good tensile properties. In addition, the thermosets retain a high percentage of their original hardness and flexural strength even after exposure to boiling water. In sum, the invention is a low-cost route to high-performance resins and thermosets.

The following examples merely illustrate the invention. Those skilled in the art will recognize many variations that are within the spirit of the invention and scope of the claims.

EXAMPLE 1

Preparation of a Chain-Extended Polyetherester Resin: 2-Methyl-1,3-propanediol as the Extender A three-liter reactor equipped with mechanical stirrer, thermocouple, nitrogen sparger, and overhead condenser is charged with a 3000 mol. wt. polyoxypropylene triol (1532 g) and maleic anhydride (825 g). The mixture is heated to 65° C. to melt the anhydride. A solution of p-toluenesulfonic acid (1.8 g) in water (151 g) is added. After the exotherm from the reaction of water and maleic anhydride subsides, the reaction mixture is heated to 190° C. over 1.25 h. The mixture is heated for 14 h at 190° C., and the acid number drops to 137 mg KOH/g. This intermediate is an acid-terminated polyetherester resin.

2-Methyl-1,3-propanediol (170 g) is added, and heating continues at 190° C. for another 8 h. The acid number drops to 55 mg KOH/g. The resulting chain-extended polyetherester resin is cooled and blended with styrene (60% resin). Gel permeation chromatography (GPC) analysis of the neat resin shows: $Mn=2090$, $Mw=15230$, $Mw/Mn=7.3$.

EXAMPLE 2

Preparation of a Chain-Extended Polyetherester Resin: Neopentyl Glycol as the Extender The procedure of Example 1 is generally followed. Heating the reaction mixture at 190° C. for 10 h gives an acid-terminated polyetherester having an acid number of 129 mg KOH/g.

Neopentyl glycol (174 g) is added, and heating continues at 190° C. for 4.5 h. The acid number drops to 60 mg KOH/g. The resulting chain-extended polyetherester resin is cooled and blended with styrene (60% resin). GPC analysis of the neat resin shows: $Mn=1850$, $Mw=12330$, $Mw/Mn=6.65$.

EXAMPLE 3

Preparation of a Chain-Extended Polyetherester Resin: Ethylene Glycol as the Extender The procedure of Example 1 is generally followed. Heating the reaction mixture at 190° C. for 15 h gives an acid-terminated polyetherester having an acid number of 133 mg KOH/g.

Ethylene glycol (104 g) is added, and heating continues at 190° C. for 5 h. The acid number drops to 59 mg KOH/g. The resulting chain-extended polyetherester resin is cooled and blended with styrene (60% resin). GPC analysis of the neat resin shows: $Mn=2180$, $Mw=14430$, $Mw/Mn=6.62$.

COMPARATIVE EXAMPLE 4

Preparation of a Propylene Glycol-Capped Polyetherester Resin

A twelve-liter reactor equipped as in Example 1 is charged with a 3000 mol. wt. polyoxypropylene triol (5000 g) and maleic anhydride (2692 g). The mixture is heated to 65° C. to melt the anhydride. A solution of p-toluenesulfonic acid (7.7 g) in water (494 g) is added. After the exotherm from the reaction of water and maleic anhydride subsides, the reaction mixture is heated to 190° C. over 1.25 h. The mixture is heated for 7 h at 190° C., and the acid number drops to 134 mg KOH/g.

Propylene glycol (500 g) is added, and heating continues at 190° C. for another 5 h. The acid number drops to 58 mg KOH/g. The resulting propylene glycol-extended polyetherester resin is cooled and blended with styrene (60% resin). Gel permeation chromatography (GPC) analysis of the neat resin shows: $Mn=1770$, $Mw=6390$, $Mw/Mn=3.62$.

The results of Examples 1–3 and Comparative Example 4 show that significant chain extension occurs only when a primary diol is used. Note the much lower weight average molecular weight of the resin of Comparative Example 4 compared with the Mw values of the resins of Examples 1–3.

EXAMPLE 5

Preparation of Polyetherester Thermosets from Primary Diol-Extended Resins

The resin/styrene blends of Examples 1–3 and Comparative Example 4 are formulated into polyetherester thermosets as follows. The resin/styrene blend is combined at room temperature with cobalt naphthenate and methyl ethyl ketone peroxide (MEKP) to give a cured thermoset. The thermoset is post-cured at 100° C. for 5 h. Physical properties of the thermosets appear in Table 1.

EXAMPLE 6

Water Resistance of Polyetherester Thermosets: Six-Day Water Boil Test

Five standard flexural strength test specimens (4"×½"×⅛") of clear cast polyetherester thermoset are immersed in distilled water in a sealed glass tube and are heated at 100° C. for 6 days. The specimens are cooled, removed from the water, and wiped dry. The samples are weighed and tested for Barcol hardness within 1 h of removal from the water. Flexural strength is tested according to ASTM D-790. Table 2 contains the results of physical testing of these samples.

The results show superior retention of flexural strength for thermosets made using primary diol-extended polyetherester resins (Examples 1–3) compared with that of a thermoset made using a propylene glycol-capped polyetherester resin (Comparative Example 4).

EXAMPLES 7–12

Preparation of Epoxy-Extended Polyetherester Resins and Thermosets from the Resins A twelve-liter reactor equipped with mechanical stirrer, thermocouple, nitrogen sparger, and overhead condenser is charged with a 2000 mol. wt. polyoxypropylene diol (5440 g) and maleic anhydride (2560 g). The mixture is heated to 60°–80° C. to melt the anhydride. A solution of p-toluenesulfonic acid (6.0 g) in water (470 g) is added. The mixture is heated to 190° C. over 2 h. The mixture is heated for 12–14 h at 190° C., and the acid number drops to 90–105 mg KOH/g. This intermediate is an acid-terminated polyetherester resin. The mixture is cooled to 160° C.

EPON 828 epoxy resin (15–20 wt. %, product of Shell Chemical) that has been preheated to 100° C. is added, and the mixture is heated at 150° C. for 2 to 5 h until the acid number drops to 35–50 mg KOH/g. Hydroquinone (0.70 g) is added, and the mixture is stirred for at least 10 min. The resulting chain-extended polyetherester resin is cooled to 110°–120° C., blended with styrene (65% resin) containing t-butylcatechol (142 ppm) and methyl-t-butylhydroquinone (430 ppm), and is cooled quickly to room temperature.

The polyetherester resins are diluted to 40 or 50% styrene (see Table 3) and are cured using 0.12 wt. % of cobalt naphthenate solution (6% Co naphthenate in mineral spirits) and 1.2 wt. % of LUPERSOL DDM9 initiator (methyl ethyl ketone peroxide, product of Atochem) at room temperature overnight, followed by a post-cure at 100° C. for 5 h. Properties of the cured thermosets appear in Table 3. Results of water-boil testing of these thermosets appear in Table 4.

The results in Table 3 show generally higher tensile and flexural strength for thermosets made from the epoxy-extended polyetherester resins (at a lower maleic anhydride level) compared with the strength properties of a thermoset made using a propylene glycol-capped polyetherester resin. As Table 4 shows, flexural strength retention is also much better in the epoxy-extended system.

EXAMPLES 13–17

Preparation of Epoxy-Extended Polyetherester Resins and Thermosets from the Resins The procedure of Examples 7–12 is generally followed. The reactor is charged with 2000 mol. wt. polyoxypropylene diol (5525 g) and maleic anhydride (2975 g). The mixture is heated to 60°–80° C. to melt the anhydride. A solution of p-toluenesulfonic acid (8.5 g) in water (546 g) is added. The mixture is heated to 190° C. over 2 h. The mixture is heated for 13 h at 190° C., and the acid number drops to 98 mg KOH/g. This intermediate is an acid-terminated polyetherester resin. The mixture is cooled to 160° C.

EPON 828 epoxy resin (10–40 wt. %) that has been preheated to 100° C. is added, and the mixture is heated at 150° C. for 3 to 4 h until the acid number drops to 20–65 mg KOH/g (the more epoxy resin, the lower the acid number). The resin is combined with styrene and stabilizers as described above.

The epoxy-extended polyetherester resins are diluted to 50% styrene and are cured as described above. Properties of the cured thermosets appear in Table 5. Results of water-boil testing of these thermosets appear in Table 6.

The results generally show the effect of increasing the wt. % of epoxy resin from 10 to 40 wt. %. Note, in Table 5, the increase in Mw/Mn of the resin, and the increase in tensile and flexural strengths of the thermosets. The properties of thermosets derived from the epoxy-extended polyetherester resins are significantly greater than those of the control thermoset, which uses a propylene glycol-capped polyetherester resin. As Table 6 shows, flexural strength retention is also much better in the epoxy-extended system.

EXAMPLES 18–20

Preparation of Epoxy-Extended Polyetherester Resins and Thermosets from the Resins A five-liter reactor equipped as described in Examples 7–12 is charged with 2000 mol. wt. polyoxypropylene diol (2470 g) and maleic anhydride (1330 g). The mixture is heated to 60°–80° C. to melt the anhydride. p-Toluenesulfonic acid (1.14 g) is added. The mixture is heated to 190° C. over 2 h. The mixture is heated for 25 h at 190° C., and the acid number drops to 119 mg KOH/g. This intermediate is an acid-terminated polyetherester resin. The mixture is cooled to 160° C.

EPON 828 epoxy resin (10–20 wt. %) that has been preheated to 100° C. is added, and the mixture is heated at 150° C. for 1.5 to 2 h until the acid number drops to 60–80 mg KOH/g. The resin is combined with styrene and stabilizers as described above.

The epoxy-extended polyetherester resins are diluted to 50% styrene and are cured as described above. Properties of the cured thermosets appear in Table 7. Results of water-boil testing of these thermosets appear in Table 8.

The results again amply demonstrate the advantages of epoxy-extended polyetherester resins compared with a conventional propylene glycol-capped polyetherester resin.

EXAMPLE 21

Preparation of an Epoxy-Extended Polyetherester Resin and Thermoset from the Resin A twelve-liter reactor equipped as described in Examples 7–12 is charged with 2000 mol. wt. polyoxypropylene diol (6600 g) and maleic anhydride (3400 g). The mixture is heated to 60°–80° C. to melt the anhydride. p-Toluenesulfonic acid (7.5 g) and water (156 g) are added. The mixture is heated to 190° C. over 2 h. The mixture is heated for 15 h at 190° C., and the acid number drops to 90–120 mg KOH/g. This intermediate is an acid-terminated polyetherester resin. The mixture is cooled to 160° C.

EPON 828 epoxy resin (20 wt. %) that has been preheated to 100° C. is added, and the mixture is heated at 150° C. for 4 h until the acid number drops to 45 mg KOH/g. The resin is combined with styrene and stabilizers as described above.

The epoxy-extended polyetherester resin is diluted to 50% styrene and is cured as described above. Comparative Example 22 is a thermoset made from a commercial iso resin. Comparative Example 23 is a thermoset made from a commercial vinyl ester resin. Properties of cured thermosets and results of water-boil testing of these thermosets, including 5% aqueous HCl and KOH boil test results, appear in Table 9.

The results show that thermosets made from epoxy-extended polyetherester resins exhibit much better resistance to hot, aqueous base compared with a conventional iso resin system (normally considered a "corrosion-resistant" system). While the surface of the iso resin samples is significantly degraded by aqueous base treatment, that of the epoxy-extended polyetherester resin system is unharmed. In addition, the resistance properties of the thermosets of the invention rival those of the more-expensive vinyl ester resin system.

EXAMPLES 24–27

Preparation of Polyetherester Thermosets by Co-curing Polyetherester Resin, Epoxy Resin, and Vinyl Monomer A polyetherester resin is prepared as described previously from a 2000 mol. wt. polyoxypropylene diol, maleic anhydride (20 wt. %), and p-toluenesulfonic acid (0.2 wt. %). The polyetherester resin (125 parts), styrene (68 parts), EPON 828 resin (amount shown in Table 10), benzoyl peroxide (2.5 parts), tert-butylperbenzoate (0.9 parts), and 2-ethyl-4-methylimidazole (catalyst for epoxy resin curing, amount shown in Table 10) are combined, poured into a mold, and cured overnight at 55° C., then post-cured for 2 h at 75° C., 2 h at 105° C., 2 h at 135° C., and 4 h at 150° C. Physical properties appear in Table 10.

The results show how tensile and flexural strength properties increase with the amount of epoxy resin extender.

EXAMPLES 28-30

Preparation of Polyetherester Thermosets by Co-curing Polyetherester Resin, Epoxy Resin, and Vinyl Monomer A polyetherester resin is prepared as described previously from a 3000 mol. wt. polyoxypropylene triol, maleic anhydride (35 wt. %), and p-toluenesulfonic acid (0.1 wt. %). The polyetherester resin is blended with 40 wt. % styrene. The resin blend, EPON 828 resin (0-20 wt. %, amount shown in Table 8), cobalt naphthenate (0.5 wt. %), dimethyl aniline (0.3 wt. %), and methyl ethyl ketone peroxide (1.5 wt. %) are combined, poured into a mold, and cured at room temperature for 16-24 h, then post-cured for 5 h at 100° C. Physical properties appear in Table 11. Results of water-boil testing of these samples also appear in Table 11. Comparison examples with commercial iso resin and vinyl ester resin-based thermosets are included.

The preceding examples are meant only as illustrations; the following claims define the scope of the invention.

TABLE 4

Physical Properties of Polyetherester Thermosets after 6-Day Water Boil Test

| Ex. # | % Weight gain | % Retention of Barcol hardness | % Retention of flexural modulus | % Retention of flexural strength |
|---|---|---|---|---|
| 7 | 1.8 | 63 | 95 | 81 |
| 8 | 1.4 | 73 | 97 | 93 |
| 9 | 1.9 | 50 | 98 | 73 |
| 10 | 2.0 | 53 | 83 | 78 |
| 11 | 1.3 | 83 | 91 | 90 |
| 12 | 1.5 | 78 | 91 | 90 |
| C4 | 1.8 | 79 | 93 | 26 |

TABLE 1

Physical Properties of Thermosets from Diol-extended Polyetherester Resins

| Ex. # | Primary diol | Tensile strength (psi) | Elongation (%) | Tensile modulus (kpsi) | Flexural strength (kpsi) | Flexural modulus (kpsi) | DTUL (°F.) |
|---|---|---|---|---|---|---|---|
| 1 | 2-Methyl-1,3-propanediol | 7220 | 2.8 | 389 | 13.8 | 398 | 228 |
| 2 | Neopentyl glycol | 7760 | 3.5 | 412 | 13.6 | 414 | 231 |
| 3 | Ethylene glycol | 7170 | 4.1 | 361 | 13.4 | 365 | 221 |
| C4 | Propylene glycol | 7140 | 4.6 | 387 | 13.3 | 380 | 184 |

TABLE 2

Physical Properties of Polyetherester Thermosets after 6-Day Water Boil Test

| Ex. # | Primary diol | % Weight gain | % Retention of Barcol hardness | % Retention of flexural modulus | % Retention of flexural strength |
|---|---|---|---|---|---|
| 1 | 2-Methyl-1,3-propanediol | 1.77 | 78 | 97 | 84 |
| 2 | Neopentyl glycol | 1.68 | 71 | 95 | 95 |
| 3 | Ethylene glycol | 1.88 | 76 | 99 | 71 |
| C4 | Propylene glycol | 1.75 | 79 | 93 | 26 |

TABLE 3

Epoxy-extended Polyetherester Thermosets

| | Resin | | | | | Thermoset | | | | | |
|---|---|---|---|---|---|---|---|---|---|---|---|
| Ex # | Wt. % MA | Wt. % epoxy resin | Rxn. time (h) | Mw/Mn | Wt. % styrene | Tensile str. (psi) | Elong. (%) | DTUL (°F.) | Barcol hard. | Flex. str. (kpsi) | Flex. mod. (kpsi) |
| 7 | 32 | 15 | 2.0 | 3.7 | 40 | 7460 | 3.7 | 174 | 30 | 14.2 | 395 |
| 8 | 32 | 15 | 2.0 | 3.7 | 50 | 8470 | 4.7 | 186 | 30 | 15.6 | 419 |
| 9 | 32 | 15 | 5.0 | 13 | 40 | 7920 | 3.7 | 199 | 30 | 14.3 | 400 |
| 10 | 32 | 20 | 4.0 | 12 | 40 | 8260 | 3.5 | 181 | 34 | 15.5 | 474 |
| 11 | 32 | 20 | 4.5 | 19 | 50 | 8820 | 3.9 | 201 | 30 | 16.1 | 443 |
| 12 | 32 | 20 | 4.0 | 8 | 50 | 8700 | 5.1 | 187 | 32 | 16.2 | 434 |
| C4 | 35 | — | — | — | 40 | 7140 | 4.6 | 184 | — | 13.3 | 380 |

MA = maleic anhydride;
epoxy resin = EPON 828 resin (product of Shell Chemical)

TABLE 5

Epoxy-extended Polyetherester Thermosets

| | Resin | | | | Thermoset | | | | | | |
|---|---|---|---|---|---|---|---|---|---|---|---|
| Ex # | Wt. % MA | Wt. % epoxy resin | Rxn. time (h) | Mw/Mn | Wt. % styrene | Tensile str. (psi) | Elong. (%) | DTUL (°F.) | Barcol hard. | Flex. str. (kpsi) | Flex. mod. (kpsi) |
| 13 | 35 | 10 | 4.0 | 9.1 | 50 | 7420 | 2.0 | 245 | 39 | 13.1 | 466 |
| 14 | 35 | 15 | 3.5 | 15 | 50 | 8110 | 2.4 | 246 | 40 | 14.6 | 475 |
| 15 | 35 | 20 | 3.0 | 14 | 50 | 8410 | 2.3 | 241 | 45 | 14.4 | 471 |
| 16 | 35 | 30 | 3.0 | 21 | 50 | 9900 | 2.8 | 208 | 42 | 17.5 | 511 |
| 17 | 35 | 40 | 3.0 | 26 | 50 | 10,900 | 3.4 | 180 | 42 | 17.8 | 498 |
| C4 | 35 | — | — | — | 40 | 7140 | 4.6 | 184 | — | 13.3 | 380 |

MA = maleic anhydride;
epoxy resin = EPON 828 resin (product of Shell Chemical)

TABLE 6

Physical Properties of Polyetherester Thermosets after 6-Day Water Boil Test

| Ex. # | % Weight gain | % Retention of Barcol hardness | % Retention of flexural modulus | % Retention of flexural strength |
|---|---|---|---|---|
| 13 | 1.6 | 77 | 94 | 92 |
| 14 | 1.6 | 95 | 93 | 88 |
| 15 | 1.5 | 89 | 96 | 92 |
| 16 | 1.6 | 83 | 91 | 75 |
| 17 | 1.6 | 71 | 97 | 89 |
| C4 | 1.8 | 79 | 93 | 26 |

TABLE 7

Epoxy-extended Polyetherester Thermosets: 35% Maleic Anhydride

| | Resin | | | | | Thermoset (50% styrene) | | | | | |
|---|---|---|---|---|---|---|---|---|---|---|---|
| Ex # | Water (g) | p-TSA (g) | Wt. % epoxy resin | Rxn. time (h) | Mw/Mn | Tensile str. (psi) | Elong. (%) | DTUL (°F.) | Barcol hard. | Flex. str. (kpsi) | Flex. mod. (kpsi) |
| 18 | 0 | 1.14 | 10 | 2.0 | 10 | 9290 | 3.6 | 199 | 40 | 18.0 | 461 |
| 19 | 0 | 1.14 | 15 | 2.0 | 14 | 10,400 | 4.6 | 195 | 30 | 18.2 | 461 |
| 20 | 0 | 1.14 | 20 | 1.0 | 29 | 10,500 | 4.7 | 196 | 35 | 18.5 | 477 |
| C4 | — | — | — | — | — | 7140 | 4.6 | 184 | — | 13.3 | 380 |

Epoxy resin = EPON 828 resin (product of Shell Chemical)
p-TSA = p-toluenesulfonic acid

TABLE 8

Physical Properties of Polyetherester Thermosets after 6-Day Water Boil Test

| Ex. # | % Weight gain | % Retention of Barcol hardness | % Retention of flexural modulus | % Retention of flexural strength |
|---|---|---|---|---|
| 18 | 2.0 | 63 | 96 | 68 |
| 19 | 2.0 | 83 | 97 | 86 |
| 20 | 1.8 | 71 | 95 | 91 |
| C4 | 1.8 | 79 | 93 | 26 |

TABLE 9

Comparison of Epoxy-Extended Polyetherester Thermosets (50% Styrene) with Commercial Iso and Vinyl Ester Resin Systems

| Ex # | Resin | Surface appearance following aq. KOH boil | % Barcol hardness retained 6-Day Boil | | | % Flex. modulus retained 6-Day Boil | | | % Flex. strength retained 6-Day Boil | | |
|---|---|---|---|---|---|---|---|---|---|---|---|
| | | | $H_2O$ | KOH | HCl | $H_2O$ | KOH | HCl | $H_2O$ | KOH | HCl |
| 21 | Poly-ether-ester | unchanged | 82 | 92 | 84 | 98 | 93 | 96 | 96 | 96 | 88 |
| C22 | Iso resin | slimy | 89 | fails | 89 | 99 | 97 | 99 | 78 | 49 | 78 |
| C23 | Vinyl ester | unchanged | 84 | 95 | 79 | 100 | 99 | 101 | 96 | 98 | 99 |

Iso resin is a commercially available isophthalate polyester resin; vinyl ester is a commercially available vinyl ester resin.
KOH is 5% aqueous potassium hydroxide solution; HCl is 5% aqueous hydrochloric acid solution.

TABLE 10

Epoxy-extended Polyetherester Thermosets: Co-Cured Systems

| | Curing conditions | | Thermoset properties | | | | |
|---|---|---|---|---|---|---|---|
| Ex # | Epoxy resin (wt. %) | EMI catalyst (wt. %) | Tensile strength (psi) | Elongation (%) | Tensile modulus (ksi) | Flexural strength (psi) | Flexural modulus (ksi) |
| 24 | 0 | 0 | 1470 | 39 | 24 | 1280 | 42 |
| 25 | 5 | 0.2 | 1940 | 33 | 69 | 2700 | 79 |
| 26 | 10 | 0.4 | 2520 | 29 | 138 | 4510 | 134 |
| 27 | 15 | 0.6 | 2670 | 29 | 144 | 5000 | 147 |

Epoxy resin = EPON 828 resin (product of Shell Chemical)
EMI = 2-ethyl-4-methylimidazole

TABLE 11

Epoxy-extended Polyetherester Thermosets: Co-Cured Systems

| | Curing Conditions | Thermoset properties | | | | | 6-Day Water Boil Results | |
|---|---|---|---|---|---|---|---|---|
| Ex # | Epoxy resin (wt. %) | Tensile strength (psi) | Elongation (%) | Tensile modulus (ksi) | Flexural strength (ksi) | Flexural modulus (ksi) | % Flexural strength retained | % Flexural modulus retained |
| 28 | 0 | 7200 | 4.2 | 416 | 13.0 | 382 | 28 | 89 |
| 29 | 10 | 7940 | 4.2 | 404 | 14.5 | 408 | 87 | 97 |
| 30 | 20 | 6135 | 6.5 | 337 | 12.3 | 349 | 88 | >100 |
| C31 | Iso resin | | | | 22.5 | 597 | 94 | 95 |
| C32 | Vinyl ester | | | | 22.7 | 534 | 92 | 91 |

Epoxy resin = EPON 828 resin (product of Shell Chemical)
Iso resin is a commercially available isophthalate polyester resin.
Vinyl ester is a commercially available vinyl ester resin.

We claim:

1. A process for making a high-performance polyetherester thermoset, said process comprising:
   (a) reacting a polyether polyol with a dicarboxylic acid or anhydride in the presence of an insertion catalyst to produce an acid-terminated polyetherester resin;
   (b) reacting the polyetherester resin with an extender selected from the group consisting of primary diols and diepoxy compounds to produce a chain-extended polyetherester resin; and
   (c) reacting the chain-extended polyetherester resin with a vinyl monomer in the presence of a free-radical initiator to produce the high-performance polyetherester thermoset.

2. The process of claim 1 wherein the polyether polyol has an average hydroxyl functionality within the range of about 2 to about 6, a hydroxyl number within the range of the range of about 28 to about 260 KOH/g, and a number average molecular weight within the range of about 400 to about 12,000.

3. The process of claim 1 wherein the polyether polyol is a polyoxypropylene diol or triol having a number average molecular weight within the range of about 1000 and about 4000.

4. The process of claim 1 wherein the insertion catalyst is selected from the group consisting of Lewis acids, protic acids that have a pKa less than about 0, and metal salts of the protic acids.

5. The process of claim 1 wherein the extender is bisphenol-A diglycidyl ether.

6. The process of claim 1 wherein the extender is a primary diol selected from the group consisting of ethylene glycol, 2-methyl-1,3-propanediol, neopentyl glycol, diethylene glycol, triethylene glycol, 1,4-butanediol, 1,6-hexanediol, 1,4-cyclohexane-dimethanol, and 1,4-benzenedimethanol.

7. The process of claim 1 wherein the vinyl monomer is styrene.

8. The process of claim 1 wherein from about 35 to about 75 wt. % of the polyetherester thermoset derives from the acid-terminated polyetherester resin.

9. The process of claim 1 wherein from about 20 to about 65 wt. % of the Polyetherester thermoset derives from the vinyl monomer.

10. The process of claim 1 wherein from about 1 to about 30 wt. % of the polyetherester thermoset derives from the extender.

11. The process of claim 1 wherein the acid-terminated polyetherester resin has an acid number within the range of about 40 to about 200 mg KOH/g.

12. A high-performance polyetherester thermoset made by the process of claim 1.

13. The thermoset of claim 12 having a flex strength retention greater than about 70% following a 6-day water boil test.

14. The thermoset of claim 12 having a higher DTUL compared with a thermoset made in the absence of the extender.

15. A process for making a chain-extended polyetherester resin useful in high-performance thermosets, said process comprising:

(a) reacting a polyether polyol with a dicarboxylic acid or anhydride in the presence of an insertion catalyst to produce an acid-terminated polyetherester resin; and (b) reacting the polyetherester resin with an extender selected from the group consisting of primary diols and diepoxy compounds to produce the chain-extended polyetherester resin.

16. The process of claim 15 wherein the polyether polyol has an average hydroxyl functionality within the range of about 2 to about 6, a hydroxyl number within the range of about 28 to about 260 mg KOH/g, and a number average molecular weight within the range of about 400 to about 12,000.

17. The process of claim 15 wherein the insertion catalyst is selected from the group consisting of Lewis acids, protic acids that have a pKa less than about 0, and metal salts of the protic acids.

18. The process of claim 15 wherein the extender is a primary diol selected from the group consisting of ethylene glycol, 2-methyl-1,3-propanediol, neopentyl glycol, diethylene glycol, triethylene glycol, 1,4-butanediol, 1,6-hexanediol, 1,4-cyclohexane-dimethanol, and 1,4-benzenedimethanol.

19. The process of claim 15 wherein the extender is a primary diol and the resulting chain-extended polyetherester resin has Mw/Mn of at least about 5.

20. The process of claim 15 wherein the extender is a diepoxy compound and the resulting chain-extended polyetherester resin has a Mw/Mn of at least about 8.

21. The process of claim 15 wherein the acid-terminated polyetherester resin has an acid number within the range of about 40 to about 200 mg KOH/g.

22. A process for making a high-performance polyetherester thermoset, said process comprising:

(a) reacting a polyether polyol with a dicarboxylic acid or anhydride in the presence of an insertion catalyst to produce an acid-terminated polyetherester resin;

(b) co-curing the polyetherester resin with a vinyl monomer and an extender selected from the group consisting of primary diols and diepoxy compounds in the presence of a free-radical initiator to produce the high-performance polyetherester thermoset.

23. The process of claim 22 wherein the acid-terminated polyetherester resin has an acid number within the range of about 40 to about 200 mg KOH/g.

* * * * *